United States Patent
Parkinson

(10) Patent No.: US 7,599,952 B2
(45) Date of Patent: Oct. 6, 2009

(54) SYSTEM AND METHOD FOR PARSING UNSTRUCTURED DATA INTO STRUCTURED DATA

(75) Inventor: David J. Parkinson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 624 days.

(21) Appl. No.: 10/937,568

(22) Filed: Sep. 9, 2004

(65) Prior Publication Data

US 2006/0053133 A1 Mar. 9, 2006

(51) Int. Cl.
*G06F 17/30* (2006.01)
(52) U.S. Cl. .................. 707/102; 707/100; 707/101
(58) Field of Classification Search .......... 707/100–102
See application file for complete search history.

(56) References Cited

U.S. PATENT DOCUMENTS

| 6,078,924 | A  | * | 6/2000  | Ainsbury et al. ............ 707/101 |
| 6,460,049 | B1 | * | 10/2002 | Becker et al. ............. 707/104.1 |
| 6,910,182 | B2 | * | 6/2005  | Huang ........................ 715/514 |
| 7,016,939 | B1 | * | 3/2006  | Rothwell et al. ............ 709/206 |
| 7,197,503 | B2 | * | 3/2007  | Palanisamy et al. ......... 707/101 |
| 7,308,400 | B2 | * | 12/2007 | Luo et al. ...................... 704/9 |
| 2002/0111951 | A1 | * | 8/2002 | Zeng ........................... 707/100 |
| 2004/0049478 | A1 | * | 3/2004 | Jasper et al. .................... 707/1 |
| 2006/0004826 | A1 | * | 1/2006 | Zartler et al. ................ 707/102 |

* cited by examiner

*Primary Examiner*—Cam-Linh Nguyen
(74) *Attorney, Agent, or Firm*—Westman, Champlin & Kelly, P.A.

(57) ABSTRACT

The present invention uses a machine-learned statistical model to map between unstructured data and structured data. By using machine learning techniques, the present parsing engine can be very quickly and easily trained for new and different locations or domains and can also accommodate for inputs which are unseen in the training data.

17 Claims, 5 Drawing Sheets

Mr. John Doe
123 Main Street,
Seattle, WA  45678
Type=Contact,
Int=3

212

| Mr. | John | Doe |
| 123 | Main | Street | , |
| Seattle | , | WA | 45678 |

TOKENS    220

FEATURES

|  | Mr. | John | Doe | 123 | ... |
|---|---|---|---|---|---|
| INIT. CAP. LTR | Y | Y | Y | N | ... |
| ALL DIGITS | N | N | N | Y | ... |
| ALL ALPHA | N | Y | Y | N | ... |
| CONT. HYPHEN | N | N | N | N | ... |

TOKENS 224

| SCHEMA ENTRIES | | Mr. | John | Doe | 123 | ... |
|---|---|---|---|---|---|---|
| | F. Name | 0.01 | 0.99 | 0.32 | 0.001 | ... |
| | L. Name | 0.07 | 0.005 | 0.61 | 0.0005 | ... |
| | Other | 0.86 | 0.002 | 0.03 | 0.002 | ... |
| | Add Line | 0.005 | 0.001 | 0.005 | 0.89 | ... |
| | City | 0.02 | 0.0005 | 0.005 | 0.0005 | ... |
| | State | 0.02 | 0.0005 | 0.02 | 0.006 | ... |
| | Zip | 0.015 | 0.001 | 0.01 | 0.10 | ... |

| F. Name | John |
|---|---|
| L. Name | Doe |
| Other | Mr. |
| Add. Line | 123 Main Street |
| City | Seattle |
| State | WA |
| Zip | 45678 |

FIG. 8

SYSTEM AND METHOD FOR PARSING UNSTRUCTURED DATA INTO STRUCTURED DATA

BACKGROUND OF THE INVENTION

The present invention deals with processing of unstructured data. More specifically, the present invention deals with processing unstructured data into structured data, such as by populating a predefined schema.

Most data that people work with today is authored, in the first instance, digitally. For example, rather than beginning to write an article on a piece of paper, an author today typically begins by writing it using a laptop computer, a desktop computer, or another type of digital text processing system. Similarly, instead of writing letters on paper, communications are often authored, in the first instance, on a computer, as electronic mail transmissions, as electronic telefacsimiles, or as instant messaging texts. In addition, rather than marking appointments on a paper calendar, many people now enter appointments electronically onto a personal information manager that contains a calendar. In fact, even voicemail messages and multimedia presentations are often created and stored electronically.

According to one source, in the year 2002, over 5 million terabytes or 5 exabytes of new information was created. Approximately 92 percent of that information was stored on magnetic media, mostly hard disc drives. Also, over 400,000 terabytes of electronic mail were sent and stored electronically.

In addition to the creation of electronic data, much text is gathered electronically. For instance, present day hardware and software components provide the ability for computers to connect, download, process and store much more electronic information than has ever been possible before. While this can greatly enhance productivity, it can also create problems.

Much of the information that is authored, accessed, downloaded, or stored in electronic form is in unstructured form. For instance, one domain of information deals with the storage of personal contact information, such as a contact name, address and telephone number. This information is generally created as unstructured data, meaning that it is generated in the form of pure, unannotated text.

This information is then imported into a usable form, such as into a contact list in a personal information manager, or into a contact list in an electronic mail system. In the past, in order to import the information, a relatively naive form of automatic mapping between the unstructured data and structured data has been used. For instance, in the past, in order to map the portions of a telephone number that is entered as unstructured text into the structured fields of "area code", "access code", and "number", handwritten rules have been used. Such handwritten rules can be thought of as a grammar that maps from input data to an output form that has more structure than the input data. However, such handwritten rules have many disadvantages.

The handwritten rules are very expensive to produce and maintain. For instance, to produce the rules, an author must generally take the time to attempt to think of every possible way that a user may enter a phone number, and write a rule to handle the mapping of that way of entering a phone number into a structured format. Of course, in order to maintain these rules, the author may be required to subsequently write additional rules that handle extensions, country codes, or various telephone system complexities that are added later in time.

Another disadvantage associated with handwritten rules is that they often do not cover the full range of possible inputs produced by real users. In other words, the author of the rules can almost never think of every possible way that a user may enter the unstructured data. If the author has not thought of a way that is used by a real user, then when such an input is encountered, the system breaks down because there is no rule to handle that specific form of input.

Yet another disadvantage involves localization. For instance, each time the handwritten rules are to be applied in a new geographic or cultural location, they must be localized. Many foreign countries, for instance, represent addresses or postal codes in drastically diverse ways. A set of rules written to handle addresses and postal codes in one country may very well not adequately handle addresses and postal codes written in a different country. Therefore, each time the system is expanded to a different cultural or geographic location, a new set of rules, or at least additional rules, must be written to handle that particular location's diverse representations of data.

SUMMARY OF THE INVENTION

The present invention uses a machine-learned statistical model to map between unstructured data and structured data. By using machine learning techniques, the present parsing engine can be very quickly and easily trained for new and different locations and domains and can also accommodate inputs which are unseen in the training data.

BRIEF DESCRIPTION OF THE DRAWINGS

FIG. 7 illustrates a result lattice in accordance with one embodiment of the present invention.

FIG. 8 illustrates a chosen solution set in accordance with one embodiment of the present invention.

DETAILED DESCRIPTION OF ILLUSTRATIVE EMBODIMENTS

The present invention deals with generating structured data from unstructured data. However, prior to describing the present invention in more detail, one embodiment of an environment in which the present invention can be used will now be discussed.

Figure 1:
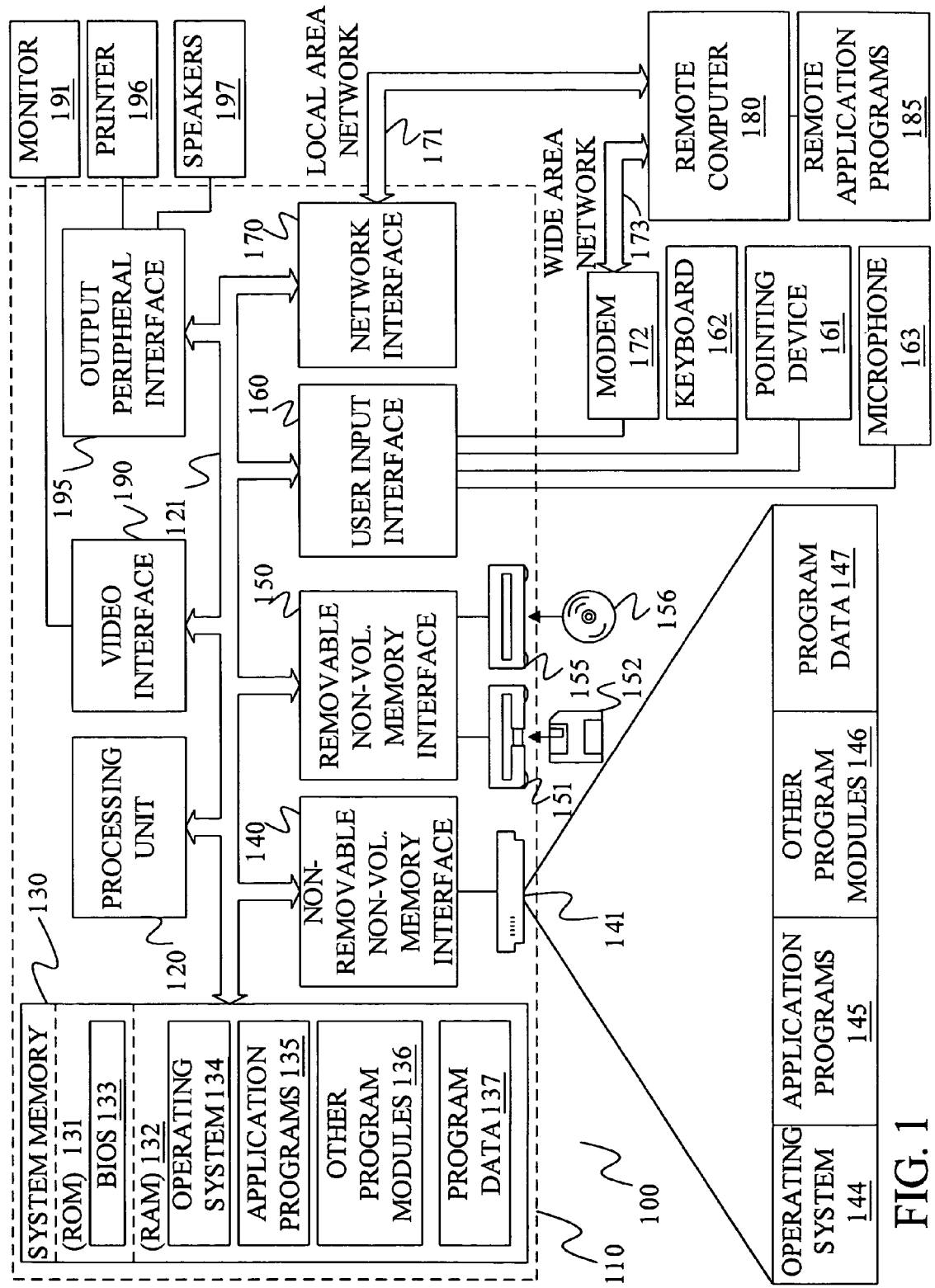
FIG. 1 illustrates one illustrative environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
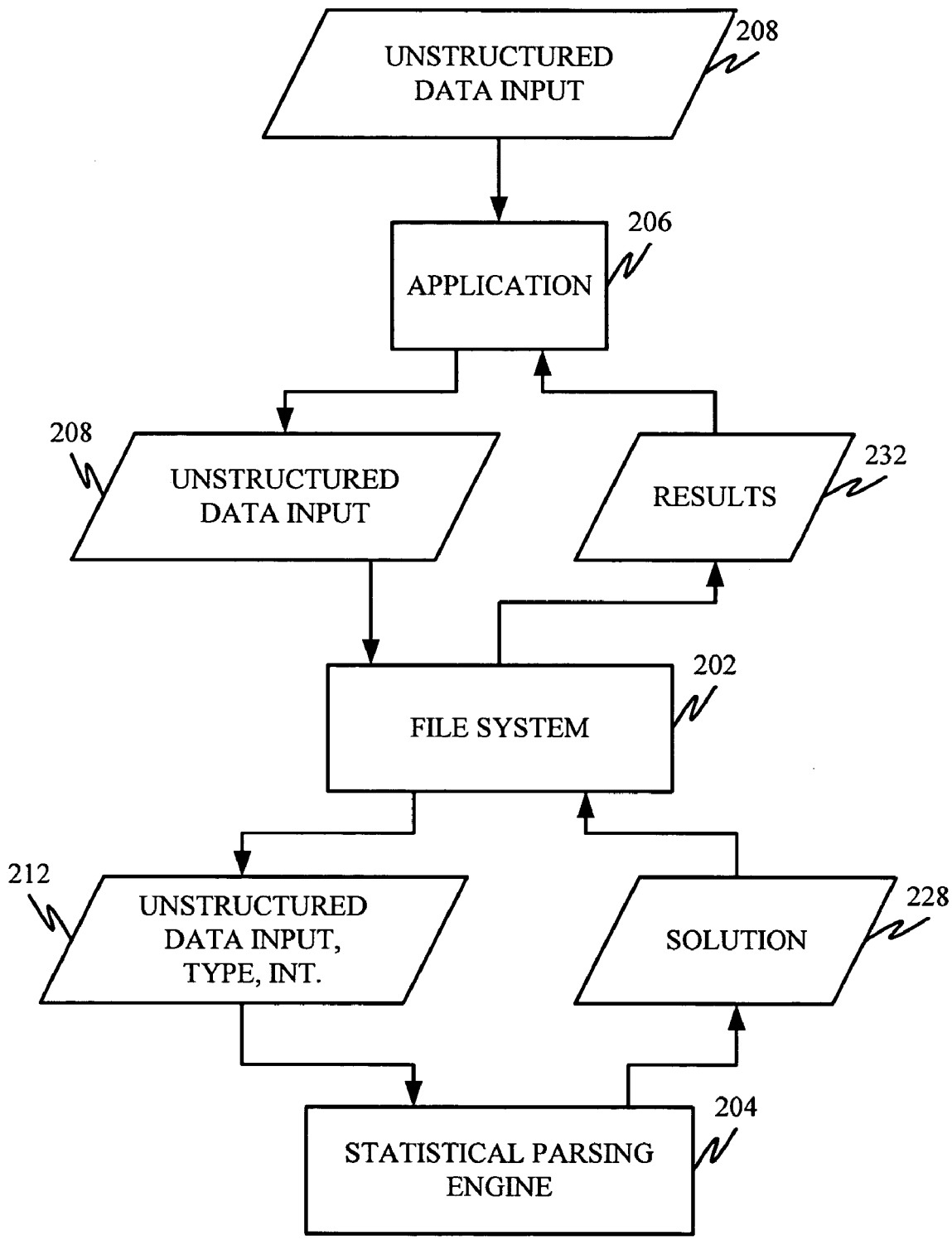
FIG. 2 illustrates a more detailed block diagram of a parsing system in accordance with one embodiment of the present invention.

FIG. 2 is a block diagram of a system 200 used in accordance with one embodiment of the present invention for receiving an unstructured data input and generating a structured output, from that input. In the embodiment shown in FIG. 2, system 200 includes a file system 202 and a statistical parsing engine 204. File system 202 is shown interacting with an application 206. In one illustrative embodiment, file system 202 is a file system runtime component provided by an operating system of the computer. For instance, file system 202 can be Windows® file system provided by Microsoft Corporation of Redmond, Wash. Of course, other file systems can be used as well. In any case, file system 202 interfaces with application 206 that needs to access data through file system 202, and also interacts with statistical parsing engine 204 that operates to create structured data from an unstructured input. File system 202 can, of course, be a file system provided by, or separate from, another operating system as well. In addition, file system 202 can interact with a data store (not shown) which is used to store data in accordance with instructions provided by the file system 202.

Statistical parsing engine 204 receives an unstructured input and generates a structured output, from that input. In the exemplary embodiment discussed herein, the unstructured input is a text string and the structured output is a populated data schema that is defined by file system 202. In other words, statistical parsing engine 204 receives an unstructured textual input and maps components of the input into a structured data schema.

In order to train statistical engine 204 to perform this mapping function, data is collected or generated that includes examples of how people represent the type of data on which engine 204 is being trained. For instance, the present example will proceed with respect to engine 204 being trained to map contact information (such as names, addresses, telephone numbers, electronic mail addresses, etc.) to a data schema used by a personal information manager. In that instance, training data is collected or generated that provides examples of how users represent contact information. This information can be generated or gathered from publicly available data stores, or intranet data stores, etc.

After the training data is gathered, it is annotated to map it to the structured schemas for which engine 204 is being trained. For instance, in the example in which engine 204 is being trained to map text to a contact data schema, then the training data examples collected are annotated to map them to those contact schemas used by the file system 202. This may illustratively be done manually.

After the training data is collected and annotated, one of a large variety of different statistical machine learning techniques is used to teach engine 204 to map data to the contact schemas based on the training data. There are a large number of known techniques for teaching a statistical model to map between inputs and a set of outputs. One such method is referred to as the maximum entropy technique, but there are a wide variety of other known techniques as well. In the present context, the commonality of all these techniques is that they train a model (engine 204) to provide file system runtime 202 with information that permits file system runtime 202 to generalize from known mappings between unstructured inputs and structured outputs (i.e., the training data) to mappings between unknown inputs and the structured output at runtime.

Application 206 is illustratively any application that calls file system 202 to retrieve structured data or to obtain structured data based on an unstructured input. Such applications can include personal information managers, communication applications, multimedia applications, etc.

Figure 3:
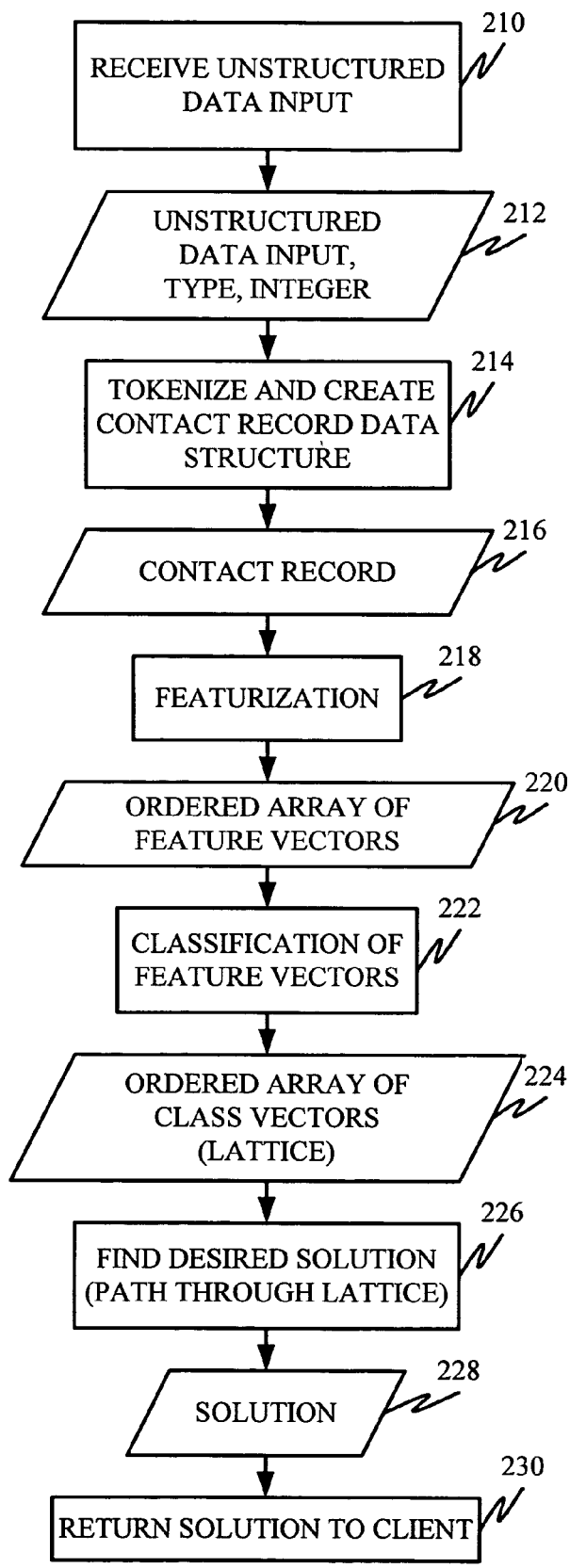
FIG. 3 is a flow diagram illustrating the operation of the system shown in FIG. 2, in greater detail.

FIG. 3 is a flow diagram illustrating the operation of system 200 in accordance with one embodiment of the present invention. The flow diagram of FIG. 3 will be discussed in conjunction with FIGS. 2 and 4-8. It will be assumed for the sake of the present discussion that application 206 allows a user to type in contact information (such as a name, and address) of a personal contact. The contact information is referred to as an unstructured data input 208 (shown in FIG. 2) that is received by application 206. In the present embodiment, it will be assumed that application 206 is configured to access file system 202 to provide unstructured data input 208 to file system 202 such that file system 202 can store it, as a structured data schema, in a desired storage location (such as in a Contacts list associated with application 206).

Therefore, application 206 first receives the unstructured data input 208. This is indicated by block 210 in FIG. 3. For example, in order to receive unstructured data input 208, application 206 may provide a dialog box for adding a Contact to the application. The user can simply type the Contact data into the contact dialog box, and it can then be provided from application 206 to file system 202.

File system 202 then accesses statistical parsing engine 204 in order to have engine 204 populate the structured data schema from the unstructured input. In order to do this, file system 202 provides the unstructured data input 208, along with a Type indicator and an Integer value (collectively referred to as data 212) to statistical parsing engine 204. This is shown in both FIGS. 2 and 3.

Data 212 illustratively includes a string argument that represents the unstructured data input 208, which is to be parsed into the structured data schema. The Type indicator illustratively represents an object to be populated, such as a Contacts data schema. The Integer value illustratively represents a maximum number of solutions that are to be returned by parsing engine 204.

Figures 4, 5, 6:
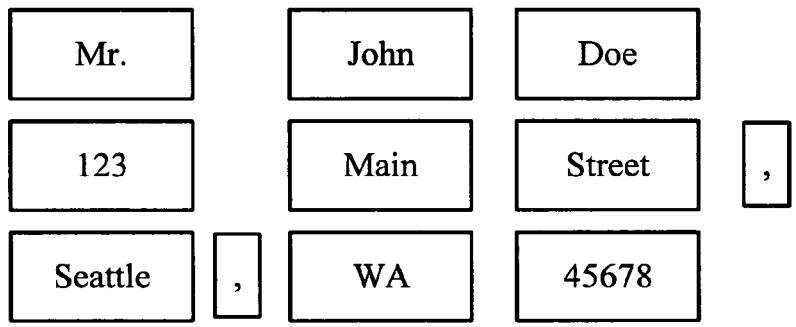
FIG. 4 illustrates one embodiment of unstructured input text.
FIG. 5 illustrates one embodiment of a tokenized input text.
FIG. 6 illustrates one embodiment of a set of feature vectors in accordance with one embodiment of the present invention.

FIG. 4 illustrates one simplified, illustrative embodiment of data 212. In the embodiment shown in FIG. 4, the unstructured contact information entered by the user is "Mr. John Doe 123 Main Street, Seattle, Wash. 43678". The Type indicator illustrates a Contact type data schema, and the Integer value is set to three.

Once statistical parsing engine 204 receives data 212, it tokenizes the data and creates a contact record data structure, because the object type has been set to "Contact". Tokens are illustratively objects and represent individual items in the unstructured textual input. Any known tokenization algorithm can be used to identify tokens in the unstructured input.

In one embodiment, the tokenization algorithm simply breaks the unstructured data input into separate tokens by identifying substrings that are separated by white space (such as a space, a tab, etc.) of course, additional complexity can also be added, in any known manner, to handle parenthetical items, to separate content words from attached punctuation marks, etc. In any case, the tokenization algorithm breaks the input into a vector of tokens.

The contact record is illustratively an object that includes lines, spans and the tokens. A line feature indicates that preceding text is delineated by a line symbol from the remaining text (i.e., the line feature indicates that the preceding text was typed on a separate line from the following text). The span feature represents a set of contiguous tokens sharing a single property. For instance, an address property may span multiple tokens such as a street name token and an address number token.

FIG. 5 illustrates one embodiment of the unstructured data input after it has been tokenized. The tokens shown in FIG. 5 comprise the vector of tokens for the input and each token is identified by a box surrounding a portion of the unstructured data input. In other words, each box shown in FIG. 5 represents a single token. Tokenizing and creating the contact record data structure is indicated by block 214, and the contact record data structure itself is indicated by block 216 in FIG. 3.

The vector of tokens is then subjected to featurization by statistical parsing engine 204. Featurization is indicated by block 218 in FIG. 3 and illustratively formulates a feature vector associated with each token, wherein the values in the feature vector indicate the presence or absence of features of interest found in that corresponding token. Of course, the particular features represented by the feature vector will vary widely based on the particular schema type that is to be populated by engine 204. However, FIG. 6 illustrates one illustrative set of features that will be discussed in accordance with the present example.

The features shown in FIG. 6 indicate whether the token contains an initial capitalized letter, whether the token comprises all digits or all alpha characters, and whether the token contains a hyphen. Of course, a wide variety of other features could be used as well and those illustrated in FIG. 6 are shown for the sake of example only.

It should also be noted that each of the features shown in FIG. 6 is represented as either being present or absent based on a binary value corresponding to that feature. Other feature values could be provided as well (such as scalar values) that indicate the relative strengths of each feature. However, for the sake of the present example, only binary values are represented in the feature vector.

It will be appreciated that, during the training phase, the training data is tokenized and feature vectors are associated with each token as well. It will further be appreciated that the featurization algorithm used at runtime to generate the feature vectors for the tokens will illustratively be identical to that used in the training phase. This will produce a more accurate estimate of the probabilities that the various tokens belong to the various portions of the data schema being populated.

FIG. 6 shows an array of feature vectors corresponding to the first four tokens shown in FIG. 5. Of course, an additional feature vector will be provided for each additional token shown in FIG. 5, but the first four are shown for exemplary purposes only. The ordered array of feature vectors is indicated by numeral 220 in both FIGS. 3 and 6.

It can be seen that the token "Mr." has a feature vector with values that indicate that the token begins with an initial capital letter, but that the token contains neither all digits nor all alpha characters (because of the presence of the period). The feature vector also indicates that the "Mr." token does not contain a hyphen.

The feature vector associated with the token "John" also shows that the token begins with an initial capital letter, is not comprised of all digits but is comprised of all alpha characters, and contains no hyphens. The feature vector for the token "Doe" is similar to that shown for the token "John". The feature vector associated the token "123" shows that the token does not begin with a capital letter, it is comprised of all digits, it is not comprised of all alpha characters, and it contains no hyphen.

Once the ordered array of feature vectors 220 is generated, statistical parsing engine 204 maps those feature vectors to slots in the structured data schema being populated. FIG. 7 shows a results lattice 224 which represents each of the tokens shown in FIG. 6 mapped to slots in a data schema. The data schema is represented by the entries in the left-most column of entries. The first entry "F. Name" indicates that the value associated with that slot in the schema in the schema is a first name. The second entry "L. Name" indicates that the values associated with that slot in the schema comprises a last name. The "Other" entry illustrates that the value associated with that slot is neither a first name nor a last name but comprises some other information. The "Add.Line" entry indicates that the value associated with that slot is an address line. The "City" entry indicates that the value associated with that slot is a city name. The "State" entry indicates that the value associated with that slot is a state name, and the "Zip" entry indicates that the values associated with that slot is a zip code.

Therefore, the leftmost set of entries in the lattice shown in FIG. 7 identifies all of the slots in one exemplary data schema for a contact. The first three schema slots represent the name of the contact, while the final four slots represent the address associated with the contact.

Because there are seven slots in the contact data schema, statistical parsing engine 204 basically operates (in one embodiment) as a seven-way statistical classifier that places each of the tokens of the unstructured data input into one of the slots in the schema. Therefore, by applying the statistical parsing engine 204 to the feature vector shown in FIG. 6, statistical parsing engine 204 generates a probability (or score) for each token, representing the probability or likelihood that the token belongs to each of the slots in the schema. The set of scores for each token is referred to herein as a class vector and the set of class vectors for the tokens in the input is referred to as an array or lattice of class vectors. For the specific example being discussed, FIG. 7 illustrates that the statistical parsing engine generates a class vector of probabilities for the token "Mr." wherein the array includes one value associated with each of the slots in the schema. FIG. 7 illustrates that for the "Mr." token, the score associated with the "F.Name" slot is 0.01, the score for the "L.Name" slot is 0.07, etc. It can be seen from the array of scores shown in FIG. 7 that the token "Mr." is mapped most closely by statistical parsing engine 204 to the slot "other" in the schema.

The statistical vectors associated with the tokens "John" "Doe" and "123" are also shown in FIG. 7. It can be seen that the statistical classifier embodied in parsing engine 204 has mapped the token "John" most closely to the "F.Name" slot in the schema. It has also mapped the token "Doe" most closely to the "L.Name" slot in the schema, and it has mapped the token "123" most closely to the "Add.Line" slot in the schema. Classifying the feature vectors to generate the ordered array or lattice of class vectors is indicated by block 222 in FIG. 3, and the ordered array or lattice of class vectors is illustrated by numeral 224 in both FIGS. 3 and 7. For any token, the probabilities associated with the set of possible classes should sum to 1.0; in FIG. 7, this means that the probabilities listed in each column should sum to 1.0.

Of course, a variety of different, known classification techniques can be used for generating the ordered array or lattice of class vectors.

Statistical parsing engine 204 then finds a desired path through the ordered array or lattice of classification vectors 222. In one illustrative embodiment, engine 204 finds the best path through the lattice by performing a search according to one of a wide variety of known algorithms. This can be done in a very naïve fashion by choosing the highest probability score in the vector associated with each token. In the example shown in FIG. 7, this would certainly work adequately, and this type of algorithm can be used in accordance with one embodiment of the invention.

However, other examples may present more difficulty. For instance, where a contact name includes a first name and last name that are both commonly used as first names, the classifier may provide the highest probability score associated with each of those names corresponding to the F.Name slot in the schema. By using the naive approach, the resultant best path would have two names associated with the F.Name slot and none associated with the L.Name slot.

Therefore, the search through lattice 224, in order to find the best path, can deploy a heuristic technique that includes constraints. The constraints will illustratively constrain the search in ways that are consistent with the particular schema object being populated. By way of example, if the parsing engine 204 has been passed a text segment, and the Type corresponding to the schema being populated is a telephone number object, then parsing engine 204 will illustratively be constrained such that it does not pick, as the best path through the result lattice, a solution containing properties other than those found in the telephone number schema. Similarly, it will not produce a solution that is inconsistent with the schema (e.g., it will not produce a solution in which there is more than one area code property). Thus, statistical parsing engine 204 illustratively searches lattice 224 to find a path with the highest likelihood score that still represents a well-formed solution.

Many standard solutions to this type of problem exist and are well known, and any one of these well known solutions will suffice for the purposes of the present invention. In one embodiment a well known constrained Viterbi search or beam search is employed. Finding the desired solution (the desired path through the lattice) is indicated by block 226, and the eventual solution is indicated by block 228 in FIG. 3.

FIG. 8 illustrates a solution 228 for the example discussed herein in greater detail. It can be seen that solution 228 includes the data schema on the left half thereof and the values associated with each slot in the data schema on the right half thereof.

The solution 228 is then returned to the client (in this case file system 202). This is indicated by block 230 in FIG. 3.

It will of course be appreciated that solution 228 passed from engine 204 to file system 202 can be the populated data schema itself. Alternatively, the solution 228 can simply identify the path through lattice 224 in a different way. In the latter embodiment, system 202, itself populates the desired data schema. File system 202 can also illustratively provide results 232 back to application 206. For instance, file system 202 may provide a representation of the populated data schema back to application 206, or it may provide a pointer to the data schema in a data store, or it can provide any other desired results 232.

It will also be appreciated that communication among components of the present system can be accomplished in any suitable way. For instance, file system 202 can illustratively communicate with parsing engine 204 in any desired manner. In one embodiment, this communication is provided through a desirable programming interface. The interface can be exposed or proprietary, as desired, and the particular mechanism by which this is performed forms no part of the present invention.

It will also be recognized that training of statistical parsing engine 204 can be different from that described in the present specification without departing from the inventive concepts of the present invention. For instance, statistical parsing engine 204 can be machine-trained and the results of the training algorithm can be checked manually. Alternatively, the statistical parsing engine 204 may be completely trained automatically.

It can thus be seen that the present invention provides distinct advantages over prior systems that are used to create structured data from an unstructured input. Because the present invention uses machine learning, it can generate statistical parsing engine 204 much more quickly and inexpensively than prior systems which used handwritten rules. Similarly, special computer expertise is not needed to produce the training data for the statistical learning mechanism.

In addition, even when the statistical parsing engine 204 is presented with a new input, unlike anything it has seen in the training data, it is far more likely to produce a useful output than prior systems. Prior rules-based systems simply break down completely, when they cannot find a rule to apply to the input.

In addition, localization and extensibility are far more easily performed using the present invention than when using prior systems. Localization is simply accomplished by gathering and annotating examples of the inputs to be encountered in a particular geographic or cultural location. These examples are then simply provided to the training system and used to train the parsing engine 204.

Extensibility is accomplished in the same way. For instance, assume that a hospital wishes to obtain a new schema to represent a patient record. The present invention can simply be used to annotate training data according to the new schema. The statistical parsing engine 204 can then be quickly trained to map input data to the new schema. This is in direct contrast to prior rules-based approaches in which a whole new grammar or set of rules would need to be generated to accommodate the new schema.

Once deployed, the present invention can thus easily generate structured data from unstructured data. For instance, a user can type in unstructured data as set out in the example discussed above, or the user can input data in another way. For instance, assume that the user has received an electronic mail transmission from a new contact, wherein the transmission includes a signature block with the contact information. The user can simply highlight the signature block, and with appropriate user interface mechanisms, drag and drop the highlighted contact information onto a user interface icon representing file system 202. File system 202 will then automatically receive the information, provide it to statistical parsing engine 204 and receive the parse results such that the contact information can automatically be added to the user's contact list.

It will also of course be appreciated that statistical parsing engine 204 need not be a single stistical model. Instead, it can be broken into a plurality of different models which are arranged hierarchically. In accordance with one embodiment, an initial general parsing engine (or model) is trained to recognize which of a plurality of different, more specific, parsing engines (or models) are to be employed to parse the input. For instance, an initial model may be used to determine the particular language of the data input. Therefore, once the language of the input is identified by the initial, general model, the data can be provided by a specific model trained for that particular language. Of course, other architectural arrangements for various statistical parsing engines or statistical models can be used as well.

Although the present invention has been described with reference to particular embodiments, workers skilled in the art will recognize that changes may be made in form and detail without departing from the spirit and scope of the invention.

What is claimed is:

1. A method of convening an unstructured input into structured data for use with an application, the method comprising:
    applying, using a processor of a computer, a statistical parse to the unstructured input to statistically map portions of the unstructured input to portions of a predefined data structure, wherein the predefined data structure has slots to be filled by specific portions of the unstructured input, and wherein applying a statistical parse to statistically map portions of the unstructured input comprises:
    breaking the unstructured input into a plurality of tokens;
    identifying features of interest in the plurality of tokens; and
    for each token of the plurality of tokens,
        generating a feature vector associated with the token, the feature vector being indicative of the features in the token; and
        generating a score associated with each slot, based on the feature vector associated with the token, the score being indicative of whether the token should fill the associated slot in the predefined data structure, wherein scores are generated for the token for each slot in the predefined data structure; and
    outputting a relationship between the unstructured input and the predefined data structure based on the statistical parse, wherein outputting comprises filling slots of the predefined data structure with portions of the unstructured input based on the scores.

2. The method of claim 1 wherein mapping comprises:
    repeating the step of generating a score associated with each slot, for each token.

3. The method of claim 2 wherein the scores associated with each slot for the tokens comprise a lattice, and wherein mapping comprises:
    selecting one or more potential solutions based on the scores, each potential solution corresponding to a path through the lattice, each path through the lattice corresponding to a different mapping of the unstructured input to the predefined data structure.

4. The method of claim 1 and further comprising:
    receiving the unstructured input from the application.

5. A computer-implemented system for generating structured data from an unstructured data input, the system comprising:
    a processor;
    a statistical parsing engine that receives the unstructured data input and, using the processor, identifies portions of the unstructured data input that correspond to portions of a predefined data structure having slots to be filled by specific portions of the unstructured data input;
    wherein the statistical parsing engine includes a tokenization component that receives the unstructured data input from an application and generates tokens based on the unstructured data input;
    wherein the statistical parsing engine identifies features in the tokens and generates a set of scores corresponding to each token, one score in the set of scores corresponding to each slot in the predefined data structure; and
    wherein the statistical parsing engine statistically maps the portions of the unstructured data input to portions in the predefined data structure based on the scores, wherein the statistical parsing engine generates a structured data output, based on the statistical mapping, by filling the portions of the predefined data structure with the portions of the unstructured data input.

6. The system of claim 5 wherein the statistical parsing engine is configured to identify the portions of the unstructured data input by mapping the portions of the unstructured data input to slots in the predefined data structure.

7. The system of claim 6 wherein the tokenization component is configured to identify the predefined data structure based on the input from the application.

8. The system of claim 6 wherein each score is indicative of a likelihood that the corresponding token should be mapped to the slot corresponding to the score.

9. The system of claim 8 wherein the statistical parsing engine is configured to identify a slot corresponding to each token based on the scores.

10. The system of claim 8 wherein the sets of scores form a lattice and wherein the statistical parsing engine is configured to identify one or more paths through the lattice based on the scores.

11. The system of claim 10 wherein each path identifies a mapping of the unstructured input to the predefined data structure.

12. The system of claim 5 wherein the predefined data structure comprises a data schema defined by a personal information manager application.

13. The system of claim 5, and further comprising an application that receives the unstructured data input from a user, provides the unstructured data input to the statistical parsing engine, and receives the output comprising the structured data, wherein the application is configured to render the output to the user.

14. A computer readable medium storing instructions which, when executed by a computer, cause the computer to perform a method comprising:
    receiving an unstructured data input from an application;
    applying a machine learned, statistical parse to the unstructured data input, using a processor of the computer, to generate a structured data output by populating a predefined data schema with portions of the unstructured data input based on the parse, wherein the predefined data schema has slots to be filled by specific portions of the unstructured data input and populating the predefined data schema comprises filling the slots in the predefined data schema with the portions of the unstructured data, wherein applying the statistical parse comprises:
    breaking the unstructured data input into tokens;
    identifying features of interest in the tokens; and
    generating a score for each of the slots in the predefined data schema, based on the features of interest in a selected token, the score being indicative of whether the selected token should fill the slot in the predefined data structure.

15. The computer readable medium of claim 14 wherein the predefined data schema comprises a data schema defined by a personal information manager application.

16. The computer readable medium of claim 14, wherein receiving the unstructured data input comprises receiving an input corresponding to text provided by a user, and further comprising:
   filling the slots in the predefined data schema with terms from the text provided by the user;
   providing the structured data output to the application; and
   visually rendering the structured data output to the user.

17. The computer readable medium of claim 14 wherein applying the statistical parse to the unstructured data input comprises:
   for each token, repeating the step of generating a score for each of the slots in the predefined data schema, wherein the scores associated with each slot for the tokens comprise a lattice;
   selecting one or more potential solutions based on the scores, each potential solution corresponding to a path through the lattice, each path through the lattice corresponding to a different mapping of the unstructured input to the predefined data structure.

* * * * *

UNITED STATES PATENT AND TRADEMARK OFFICE
CERTIFICATE OF CORRECTION

| | | |
|---|---|---|
| PATENT NO. | : 7,599,952 B2 | Page 1 of 1 |
| APPLICATION NO. | : 10/937568 | |
| DATED | : October 6, 2009 | |
| INVENTOR(S) | : David J. Parkinson | |

It is certified that error appears in the above-identified patent and that said Letters Patent is hereby corrected as shown below:

In column 11, line 17, in Claim 1, delete "convening" and insert -- converting --, therefor.

Signed and Sealed this
Fifteenth Day of February, 2011

David J. Kappos
*Director of the United States Patent and Trademark Office*